United States Patent
Singh

(10) Patent No.: US 11,333,056 B2
(45) Date of Patent: May 17, 2022

(54) GASOLINE PARTICULATE FILTER BRICK DETECTION TECHNIQUES

(71) Applicant: Jaideep Singh, Windsor (CA)

(72) Inventor: Jaideep Singh, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 352 days.

(21) Appl. No.: 16/511,534

(22) Filed: Jul. 15, 2019

(65) Prior Publication Data

US 2021/0017892 A1   Jan. 21, 2021

(51) Int. Cl.
| | |
|---|---|
| *G01M 15/00* | (2006.01) |
| *F01N 11/00* | (2006.01) |
| *B01D 46/44* | (2006.01) |
| *F01N 3/035* | (2006.01) |

(52) U.S. Cl.
CPC .......... *F01N 11/002* (2013.01); *B01D 46/448* (2013.01); *F01N 3/035* (2013.01); *B01D 2279/30* (2013.01); *F01N 2550/04* (2013.01)

(58) Field of Classification Search
CPC .... F01N 11/002; F01N 3/035; F01N 2550/04; B01D 46/448; B01D 2279/30
USPC ...................................................... 73/114.75
See application file for complete search history.

(56) References Cited

U.S. PATENT DOCUMENTS

| | | |
|---|---|---|
| 7,797,926 B2 | 9/2010 | Nishino et al. |
| 8,770,016 B2 | 7/2014 | Uchiyama et al. |
| 9,399,185 B2 | 7/2016 | Bromberg et al. |
| 9,599,004 B2 | 3/2017 | Takaoka |
| 2005/0143897 A1* | 6/2005 | Ripper ................. F01N 11/002 701/101 |
| 2008/0041035 A1* | 2/2008 | Sawada ................ F01N 11/005 60/277 |
| 2010/0058743 A1* | 3/2010 | Tsukada ............. F01N 13/0097 60/287 |
| 2011/0005198 A1* | 1/2011 | Ante ...................... F01N 11/00 60/273 |
| 2015/0040539 A1* | 2/2015 | Tylutki ................ F01N 13/008 60/274 |
| 2016/0222900 A1* | 8/2016 | Nishizawa ........... F02D 41/024 |
| 2017/0182447 A1* | 6/2017 | Sappok .................. F01N 3/021 |
| 2020/0200063 A1* | 6/2020 | Nienhoff ............... F01N 11/005 |

FOREIGN PATENT DOCUMENTS

| | | |
|---|---|---|
| EP | 2268903 B1 | 6/2015 |
| JP | 2004308454 A | 11/2004 |

\* cited by examiner

*Primary Examiner* — Jason D Shanske

(74) *Attorney, Agent, or Firm* — Ralph E. Smith

(57) ABSTRACT

A gasoline particulate filter (GPF) diagnostic technique utilizes an upstream temperature sensor arranged at an upstream point relative to a GPF brick that the GPF is configured to house and configured to measure an upstream temperature of exhaust gas produced by an engine, a downstream temperature sensor arranged at a downstream point relative to the GPF brick and configured to measure a downstream temperature of the exhaust gas produced by the engine, and a controller configured to detect whether the GPF brick is damaged or missing based on a temperature difference between the upstream and downstream exhaust gas temperatures, a set of temperature thresholds, and a current operational mode of the engine.

15 Claims, 2 Drawing Sheets

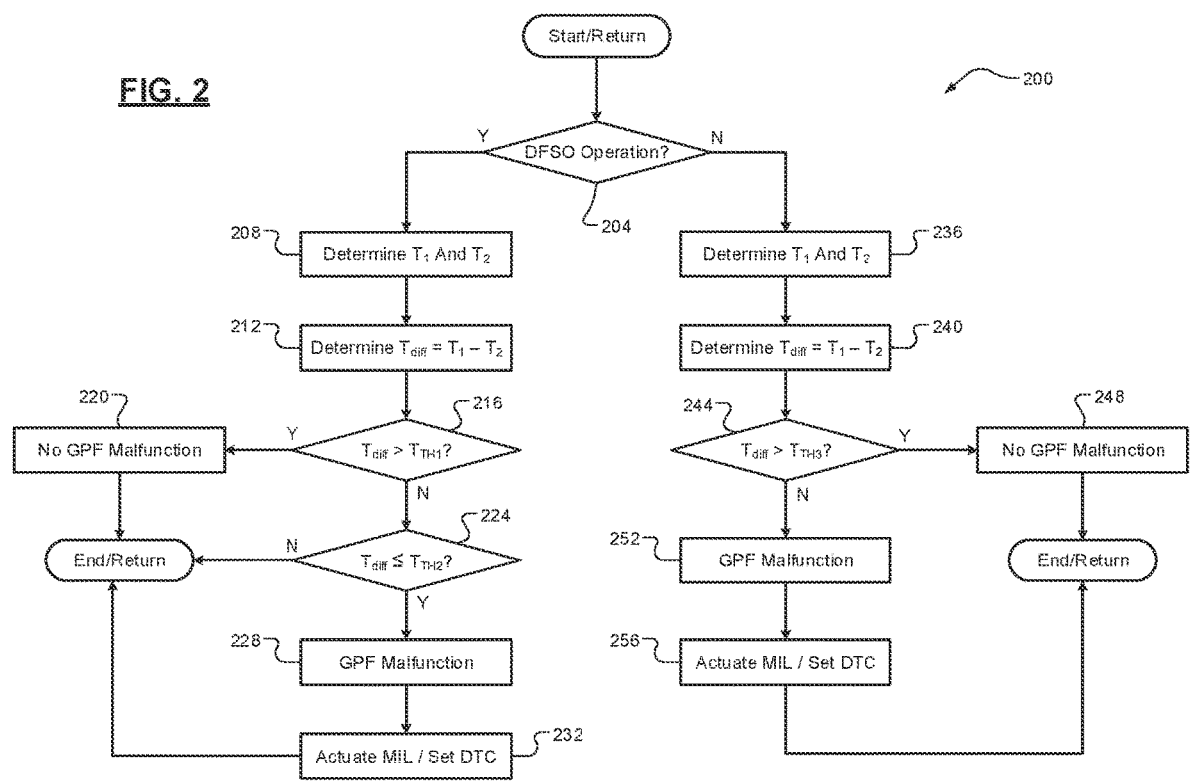

GASOLINE PARTICULATE FILTER BRICK DETECTION TECHNIQUES

FIELD

The present application generally relates to gasoline particulate filters (GPFs) and, more particularly, to techniques for detecting a malfunction of a GPF.

BACKGROUND

A gasoline particulate filter (GPF) is a device that traps particulate matter (e.g., soot) in exhaust gas produced by a gasoline engine, particularly a gasoline direct injection (GDI) engine. Current emissions regulations specify that a vehicle diagnostic system must be able to detect malfunctions of the GPF, including both damage to (e.g., a crack in) the GPF material (also known as the "GPF brick") and a missing GPF brick. Conventional techniques utilize upstream/downstream pressure sensors to detect these GPF malfunctions. Exhaust system pressure sensors, however, typically suffer from many different noise factors including, but not limited to, pressure noise caused by cross-sectional area differences in the exhaust system (e.g., for reduced packaging) and driver throttle input variations. Additionally, pressure sensors are susceptible to freezing and thus potentially malfunctioning in cold temperatures. All of these factors could negatively affect the robustness of the GPF malfunction diagnostics. Accordingly, while such conventional GPF diagnostic systems do work well for their intended purpose, there remains a need for improvement in the relevant art.

SUMMARY

According to one example aspect of the invention, a gasoline particulate filter (GPF) diagnostic system for a vehicle comprising a gasoline engine and an exhaust system with a GPF is presented. In one exemplary implementation, the GPF diagnostic system comprises: an upstream temperature sensor arranged at an upstream point relative to a GPF brick that the GPF is configured to house and configured to measure an upstream temperature of exhaust gas produced by the engine, a downstream temperature sensor arranged at a downstream point relative to the GPF brick and configured to measure a downstream temperature of the exhaust gas produced by the engine, and a controller configured to detect whether the GPF brick is damaged or missing based on a temperature difference between the upstream and downstream exhaust gas temperatures, a set of temperature thresholds, and a current operational mode of the engine.

In some implementations, when the current operational mode of the engine is deceleration fuel shut-off (DFSO), the controller is configured to: detect that the GPF brick is damaged or missing when the temperature difference is greater than a first temperature threshold of the set of temperature thresholds, and detect that the GPF brick is not damaged or missing when the temperature difference is less than or equal to a second temperature threshold of the set of temperature thresholds that is less than the first temperature threshold. In some implementations, the first temperature threshold is a calibratable positive number and the second temperature threshold is approximately zero.

In some implementations, when the current operational mode of the engine is normal operation and not DFSO, the controller is configured to: detect that the GPF brick is damaged or missing when the temperature difference is greater than a temperature threshold of the set of temperature thresholds, and detect that the GPF brick is not damaged or missing when the temperature difference is less than or equal to the temperature threshold. In some implementations, the temperature threshold is zero. In some implementations, a cross-sectional area of the exhaust system at the upstream point is greater than a cross-sectional area of the exhaust system at the downstream point.

In some implementations, the GPF is integrated with an upstream catalytic converter. In some implementations, the GPF is separate from an upstream catalytic converter. In some implementations, the controller is configured to detect whether the GPF brick is damaged or missing without using a pressure sensor.

According to another example aspect of the invention, a method of detecting a malfunction of a GPF of an exhaust system of a vehicle having a gasoline engine is presented. In one exemplary implementation, the method comprises: receiving, by a controller, an upstream temperature of exhaust gas produced by the engine from an upstream temperature sensor arranged at an upstream point relative to a GPF brick that the GPF is configured to house, receiving, by the controller, a downstream temperature of the exhaust gas produced by the engine from a downstream temperature sensor arranged at a downstream point relative to the GPF brick, and detecting, by the controller, whether the GPF brick is damaged or missing based on a temperature difference between the upstream and downstream exhaust gas temperatures, a set of temperature thresholds and a current operational mode of the engine.

In some implementations, when the current operational mode of the engine is DFSO, the method further comprises: detecting, by the controller, that the GPF brick is damaged or missing when the temperature difference is greater than a first temperature threshold, and detecting, by the controller, that the GPF brick is not damaged or missing when the temperature difference is less than or equal to a second temperature threshold that is less than the first temperature threshold. In some implementations, the first temperature threshold is a calibratable positive number and the second temperature threshold is approximately zero.

In some implementations, when the current operational mode of the engine is normal operation and not DFSO, the method further comprises: detecting, by the controller, that the GPF brick is damaged or missing when the temperature difference is greater than a temperature threshold, and detecting, by the controller, that the GPF brick is not damaged or missing when the temperature difference is less than or equal to the temperature threshold. In some implementations, the temperature threshold is zero. In some implementations, a cross-sectional area of the exhaust system at the upstream point is greater than a cross-sectional area of the exhaust system at the downstream point.

In some implementations, the GPF is integrated with an upstream catalytic converter. In some implementations, the GPF is separate from an upstream catalytic converter. In some implementations, the detecting of whether the GPF brick is damaged or missing is performed without using a pressure sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a flow diagram of a method of detecting a malfunction of a GPF according to the principles of the present disclosure.

DETAILED DESCRIPTION

Figure 1:
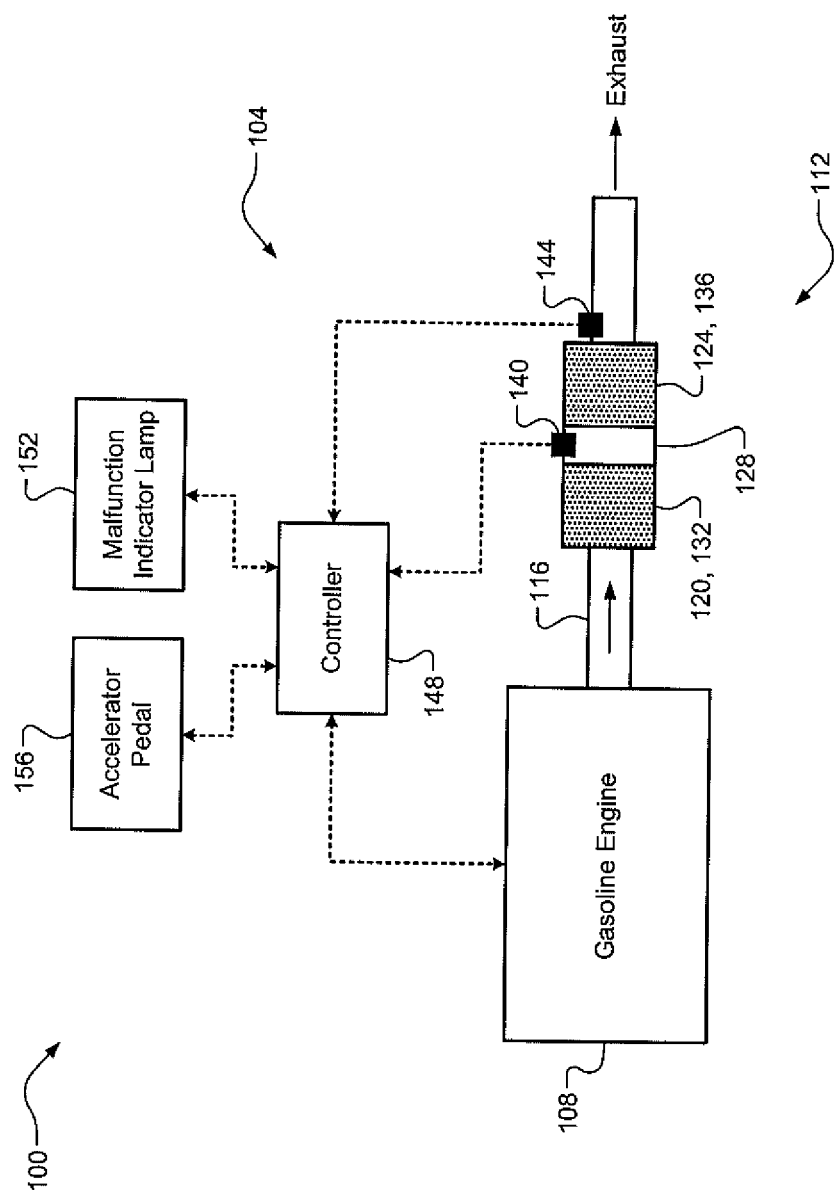
FIG. 1 is a diagram of a vehicle having a gasoline particulate filter (GPF) diagnostic system according to the principles of the present disclosure.

As discussed above, conventional gasoline particulate filter (GPF) diagnostic systems utilize one or more pressure sensors to detect a malfunction of a GPF, including damage to (e.g., a crack in) the GPF brick or a missing GPF brick. Because exhaust gas pressure sensors suffer from many sources of noise, these conventional GPF diagnostic systems require substantial calibration efforts and, in some cases, could lack the robustness required to meet current emissions regulations. Implementing pressure sensors also increases costs. Other particulate filter related sensors, such as particulate matter (PM) sensors and radio frequency (RF) sensors, similar increase costs. Accordingly, improved GPF diagnostic techniques are presented that do not utilize pressure sensors, PM sensors, or RF sensors. Instead, these techniques utilize existing upstream and downstream temperature sensors in the exhaust system to detect the above-described GPF malfunctions. Temperature sensors are less sensitive to noise compared to pressure sensors, which increases the GPF diagnostic robustness. Depending on the current operational mode of the engine (deceleration fuel shut-off, or DFSO, or non-DFSO normal operation/driving, etc.), the upstream-downstream temperature difference is compared to particular threshold(s) to detect a GPF malfunction. Upon detecting the GPF malfunction, remedial action could be taken, such as actuating a malfunction indicator lamp (MIL) and/or setting a diagnostic trouble code (DTC).

Referring now to FIG. 1, a diagram of a vehicle 100 comprising a GPF diagnostic system 104 is illustrated. The vehicle 100 comprises a gasoline engine 108 (e.g., a gasoline direct injection, or GDI engine) that combusts a mixture of air and gasoline within cylinders to drive pistons that rotatably turn a crankshaft to generate drive torque that is transferred to a driveline via a transmission for vehicle propulsion. It will be appreciated that the techniques of the present disclosure could also be applicable to port injection gasoline engines as well as diesel engines having diesel particulate filters (DPFs). Exhaust gas resulting from combustion is expelled from the cylinders into an exhaust system 112 comprising an exhaust passage 116 having at least a catalytic converter 120 and a GPF 124 disposed therealong. In one exemplary implementation, the catalytic converter 120 and the GPF 124 are integrated together such that a common housing 128 is configured to house both a three-way catalytic converter material 132 (e.g., precious metal, such as platinum, palladium, or rhodium) and a GPF brick 136 (e.g., a cordierite or silicon carbide wall flow filter or a ceramic or metal fiber flow-through filter). It will be appreciated, however, that the catalytic converter 120 could be a separate device disposed upstream from the GPF 124 and having its own separate housing. For purposes of this disclosure, this housing 128 will be referred hereinafter as GPF housing 128. It will also be appreciated that the GPF brick 136 could be coated with the same or similar three-way catalytic converter material 132.

An upstream temperature sensor 140 is arranged upstream relative to where the GPF brick 136 is configured to reside in the GPF housing 128 and a downstream temperature sensor 144 is arranged downstream relative to the where the GPF brick 136 is configured to reside in the GPF housing 128. In one exemplary implementation, the cross-sectional area of the exhaust system 112 is larger where the upstream temperature sensor 140 is arranged compared to where the downstream temperature sensor 144 is arranged for reduced packaging, but it will be appreciated that the cross-sectional areas at these two measurement points could be the same. A controller 148 is configured to control operation of the vehicle 100 (e.g., engine air/fuel/spark), such as to achieve a desired drive torque. The controller 148 is also configured to perform the GPF diagnostic techniques of the present disclosure. Thus, the controller 148 is in communication with the upstream and downstream temperature sensors 140, 144, as well as an optional MIL 152, which collectively represent the GPF diagnostic system 104. The controller 148 is also configured to determine whether or not the engine 108 is currently operating in the DFSO mode, such as when a driver of the vehicle 100 is not providing input via an accelerator pedal 156. Based on the current operational mode and a difference between the upstream and downstream exhaust gas temperatures, the controller 148 is configured to detect a malfunction of the GPF 124. As previously described, this could be either damage to (e.g., a crack in) the GPF brick 136 or a missing GPF brick 136. It will be appreciated that a damaged or cracked GPF brick 136 could cause the same exhaust gas temperature fluctuations as a missing GPF brick 136, but it will also be appreciated that the techniques of the present disclosure could be specifically applicable to detecting a missing GPF brick 136 and that detection of a damaged or cracked GPF brick 136 could slightly vary or could be performed using a separate process.

Referring now to FIG. 2, a flow diagram of a GPF diagnostic method 200 according to the principles of the present disclosure and corresponding data plots 300, 350 are illustrated. At 204, the controller 148 determines whether the engine 108 is operating in a DFSO operational mode or a non-DFSO operational mode. This determination could be based on, for example, whether the driver of the vehicle 100 is depressing the accelerator pedal 156. It will be appreciated that this determination could also be based on other factors, such as the engine 108 being on, and that the controller 148 will know whether DFSO is active or not because the controller 148 controls the engine 108. One benefit of operating the engine 108 in the DFSO mode, for example, is increased fuel economy. When DFSO is active, the method 200 proceeds to 208. Otherwise, the method 200 proceeds to 236. As previously discussed herein, the upstream vs. downstream temperature difference for a present GPF brick 136 versus a missing GPF brick 136 will vary depending on whether DFSO is active (leaner exhaust gas) or not active (richer exhaust gas).

At 208, the controller 148 determines the upstream and downstream exhaust gas temperatures ($T_1$, $T_2$) from the upstream and downstream temperature sensors 140 and 144, respectively. At 212, the controller 148 determines a temperature difference between the upstream exhaust gas temperature $T_1$ and the downstream exhaust gas temperature $T_2$ ($T_{diff}=T_1-T_2$). At 216, the controller 148 determines whether the temperature difference is greater than a first temperature threshold ($T_{TH1}$). This first temperature threshold should be a calibratable positive number because it is expected that when the GPF brick 136 is present, it will absorb some thermal energy from the exhaust gas. When true, the method 200 proceeds to 220 where the controller 148 detects that the GPF brick 136 is present and the method 200 then ends or returns to 204. Otherwise, the method 200 proceeds to 224 where the controller 148 determines whether the temperature difference is less than or equal to a smaller second temperature threshold ($T_{TH2}$). This second temperature threshold should be zero or approximately zero because when the GPF brick 136 is missing there should be little to no drop in exhaust gas temperature depending upon the cross-sectional difference between the locations of the upstream and downstream temperature sensors 140, 144. A temperature difference between temperature thresholds $T_{TH1}$ and $T_{TH2}$ could be inconclusive and thus the method 200 could return to 204 for another cycle. It will be also appreciated that only a single temperature threshold could be used for the GPF brick 136 detection. When true, the method 200 proceeds to 228 where the controller 148 determines that the GPF brick 136 is missing and accordingly detects a malfunction of the GPF 124. The controller 148 could then actuate the MIL 152 and/or set a DTC at 256 and the method 200 then ends or returns to 204.

At 236, the controller 148 determines the upstream and downstream exhaust gas temperatures $T_1$ and $T_2$ from the upstream and downstream temperature sensors 140 and 144, respectively. At 240, the controller 148 determines the temperature difference $T_{diff}$ between the upstream exhaust gas temperature $T_1$ and the downstream exhaust gas temperature $T_2$. At 244, the controller 148 determines whether the temperature difference is greater than a third temperature threshold ($T_{TH3}$). This third temperature threshold should be zero because it is expected that when the GPF brick 136 is present, it will absorb some thermal energy from the exhaust gas. Conversely, it is expected that when the GPF brick 136 is missing, a higher pressure at the downstream temperature sensor 144 (e.g., due to its smaller cross-sectional area) will cause the downstream exhaust gas temperature $T_2$ to be higher, assuming the ideal gas law ($P_1 * V_1 / T_1 = P_2 * V_2 / T_2$, where $P_1$ and $P_2$ and $V_1$ and $V_2$ are pressures and volumes, respectively). It will be appreciated that if the cross-sectional areas at the two measurement points were the same, then it would be expected that when the GPF brick 136 is missing that the temperature difference should be zero (or approximately zero). When 244 is true, the method 200 proceeds to 248 where the controller 148 detects that the GPF brick 136 is present and the method 200 ends or returns to 204. Otherwise, the method 200 proceeds to 252 where the controller 148 detects that the GPF brick 136 is missing and accordingly detects a malfunction of the GPF 124. The controller 148 could then actuate the MIL 152 and/or set the DTC at 256 and the method 200 then ends or returns to 204.

It will be appreciated that the actuation of the MIL 152 and/or the setting of the DTC as described above could be performed after detecting the malfunction of the GPF 124 a plurality of times (e.g., a malfunction counter exceeding a malfunction counter threshold) in an attempt to avoid false malfunction detections. It will also be appreciated that other remedial action could be taken, such as commanding the engine 108 to operate in a limp-home or other modified mode to mitigate emissions.

The term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A gasoline particulate filter (GPF) diagnostic system for a vehicle comprising a gasoline engine and an exhaust system with a GPF, the GPF diagnostic system comprising:
   an upstream temperature sensor arranged at an upstream point relative to a GPF brick that the GPF is configured to house, and configured to measure an upstream temperature of exhaust gas produced by the engine;
   a downstream temperature sensor arranged at a downstream point relative to the GPF brick and configured to measure a downstream temperature of the exhaust gas produced by the engine; and
   a controller configured to:
      detect whether a current operational mode of the engine is normal operation or deceleration fuel shut off (DFSO); and
      detect whether the GPF brick is damaged or missing based on a temperature difference between the upstream and downstream exhaust gas temperatures, a set of temperature thresholds, and whether the current operational mode of the engine is normal operation or DFSO,
   wherein when the current operational mode of the engine is DFSO, the controller is configured to (i) detect that the GPF brick is not damaged or missing when the temperature difference is greater than a first temperature threshold of the set of temperature thresholds, and (ii) detect that the GPF brick is damaged or missing when the temperature difference is less than or equal to a second temperature threshold of the set of temperature thresholds that is less than the first temperature threshold,
   wherein the first temperature threshold is a first calibratable positive number and the second temperature threshold is zero or a second calibratable positive number.

2. The GPF diagnostic system of claim 1, wherein when the current operational mode of the engine is normal operation and not DFSO, the controller is configured to:
   detect that the GPF brick is not damaged or missing when the temperature difference is greater than a third temperature threshold of the set of temperature thresholds; and
   detect that the GPF brick is damaged or missing when the temperature difference is less than or equal to the third temperature threshold.

3. The GPF diagnostic system of claim 2, wherein the third temperature threshold is zero.

4. The GPF diagnostic system of claim 3, wherein a cross-sectional area of the exhaust system at the upstream point is greater than a cross-sectional area of the exhaust system at the downstream point.

5. The GPF diagnostic system of claim 1, wherein the GPF is integrated with an upstream catalytic converter.

6. The GPF diagnostic system of claim 1, wherein the GPF is separate from an upstream catalytic converter.

7. The GPF diagnostic system of claim 1, wherein the controller is configured to detect whether the GPF brick is damaged or missing without using a pressure sensor.

8. A method of detecting a malfunction of a gasoline particulate filter (GPF) of an exhaust system of a vehicle having a gasoline engine, the method comprising:
   receiving, by a controller, an upstream temperature of exhaust gas produced by the engine from an upstream temperature sensor arranged at an upstream point relative to a GPF brick that the GPF is configured to house;
   receiving, by the controller, a downstream temperature of the exhaust gas produced by the engine from a downstream temperature sensor arranged at a downstream point relative to the GPF brick;
   detecting, by the controller, whether a current operational mode of the engine is normal operation or deceleration fuel shutoff (DFSO); and
   detecting, by the controller, whether the GPF brick is damaged or missing based on a temperature difference between the upstream and downstream exhaust gas temperatures, a set of temperature thresholds and whether the current operational mode of the engine is normal operation or DFSO,
   wherein when the current operational mode of the engine is normal operation and not DFSO, the method further comprises (i) detecting, by the controller, that the GPF brick is not damaged or missing when the temperature difference is greater than a first temperature threshold of the set of temperature thresholds, and (ii) detecting, by the controller, that the GPF brick is damaged or missing when the temperature difference is less than or equal to the first temperature threshold.

9. The method of claim 8, wherein when the current operational mode of the engine is DFSO, the method further comprises:
   detecting, by the controller, that the GPF brick is not damaged or missing when the temperature difference is greater than a second temperature threshold of the set of temperature thresholds; and
   detecting, by the controller, that the GPF brick is damaged or missing when the temperature difference is less than or equal to a third temperature threshold of the set of temperature thresholds that is less than the second temperature threshold.

10. The method of claim 9, wherein the second temperature threshold is a first calibratable positive number and the third temperature threshold is zero or a second calibratable positive number.

11. The method of claim 8, wherein the first temperature threshold is zero.

12. The method of claim 11, wherein a cross-sectional area of the exhaust system at the upstream point is greater than a cross-sectional area of the exhaust system at the downstream point.

13. The method of claim 8, wherein the GPF is integrated with an upstream catalytic converter.

14. The method of claim 8, wherein the GPF is separate from an upstream catalytic converter.

15. The method of claim 8, wherein the detecting of whether the GPF brick is damaged or missing is performed without using a pressure sensor.

* * * * *